(12) United States Patent
Seki

(10) Patent No.: US 7,000,991 B2
(45) Date of Patent: Feb. 21, 2006

(54) VEHICULAR SEAT

(75) Inventor: Kazuhiro Seki, Chigasaki (JP)

(73) Assignee: Autech Japan Inc., Kanagawa (JP)

( * ) Notice: Subject to any disclaimer, the term of this patent is extended or adjusted under 35 U.S.C. 154(b) by 0 days.

(21) Appl. No.: 10/723,279

(22) Filed: Nov. 25, 2003

(65) Prior Publication Data

US 2004/0189075 A1  Sep. 30, 2004

(30) Foreign Application Priority Data

Mar. 28, 2003  (JP)  ............................. 2003-090072

(51) Int. Cl.
*B60N 2/02* (2006.01)

(52) U.S. Cl. .................... 297/344.14; 297/344.1; 297/423.2; 296/65.12

(58) Field of Classification Search ............ 297/344.14, 297/344.1, 423.19, 423.2, 423.22, 423.23; 296/65.12, 65.06, 65.07
See application file for complete search history.

(56) References Cited

U.S. PATENT DOCUMENTS

| | | | | |
|---|---|---|---|---|
| 2,480,300 A | * | 8/1949 | Luketa | 297/423.2 |
| 2,481,970 A | * | 9/1949 | Bell | 297/423.15 |
| 3,252,545 A | | 5/1966 | Quayle | |
| 3,718,263 A | | 2/1973 | Strecke | |
| 3,841,696 A | * | 10/1974 | Wagner | 296/65.13 |
| 4,541,669 A | * | 9/1985 | Goldner | 297/284.11 |
| 5,161,765 A | * | 11/1992 | Wilson | 248/425 |
| 5,328,321 A | | 7/1994 | Moffett et al. | |
| 5,527,952 A | * | 6/1996 | Kuroda et al. | 560/262 |
| 5,630,638 A | * | 5/1997 | Hirasawa et al. | 296/65.07 |
| 5,711,578 A | * | 1/1998 | Wagener | 297/423.3 |
| 5,711,580 A | * | 1/1998 | Barclay et al. | 297/423.33 |
| 5,769,480 A | * | 6/1998 | Gebhardt | 296/65.12 |
| 5,902,013 A | | 5/1999 | Hong | |
| 6,050,366 A | * | 4/2000 | Lyons | 187/200 |
| 6,106,063 A | * | 8/2000 | Dauphin | 297/284.11 |
| 6,131,871 A | | 10/2000 | Bernhardt et al. | |
| 6,318,802 B1 | * | 11/2001 | Sjostrom et al. | 297/344.1 |
| 2004/0188585 A1 | | 9/2004 | Furukawa et al. | |

FOREIGN PATENT DOCUMENTS

| | | | |
|---|---|---|---|
| FR | 2699129 A1 | * | 6/1994 |
| JP | 05096981 A | * | 4/1993 |
| JP | 2001-1811 | | 1/2001 |
| JP | 2001309833 A | * | 11/2001 |

* cited by examiner

*Primary Examiner*—Peter M. Cuomo
*Assistant Examiner*—Stephen D'Adamo
(74) *Attorney, Agent, or Firm*—Jordan and Hamburg LLP

(57) ABSTRACT

There is provided a vehicular seat capable of achieving smooth sliding motion. A first slider is formed by connecting center rails, on an outside of inner rails to each other by brackets, and a second slider, having a seat, is formed by connecting outer rails to each other by a bracket. A drive mechanism has ends of a driving chain, set around a drive sprocket, fixed to the bracket of the first slider after being returned by sprockets of the inner rail. A sending-out mechanism, which moves the second slider beyond the first slider when the first slider is moved beyond a swivel upper, is formed by fixing a sending-out chain, which is fixed relative to the inner rail and to the bracket of the outer rail after being returned by a sprocket at a front end of the center rail.

12 Claims, 7 Drawing Sheets

VEHICULAR SEAT

BACKGROUND OF THE INVENTION

1. Field of the Invention

The present invention relates to a vehicular seat forming an automotive seat.

2. Description of the Related Art

Conventionally, a vehicle is provided with a seat 801 as shown in FIG. 7. The seat 801 is fixed to a floor 803 via a driving unit 802 for moving the seat 801 between the outside and inside of cabin (for example, see Japanese Patent Laid-Open No. 2001-001811).

The driving unit 802 includes a rotation mechanism 811 and a slide mechanism 812 provided on the rotation mechanism 811, and is constructed so as to be capable of moving the seat 801 to the outside of cabin after turning the seat 801 to the door opening side.

The slide mechanism 812 includes a pair of inner rails 822 formed on a swivel upper portion 821 turned by the rotation mechanism 811, a pair of center rails 823 provided on the outside of both the inner rails 822, and a pair of outer rails 824 provided on the outside of the center rails 823. The seat 801 is fixed to a seat leg 825 bridging the outer rails 824.

The swivel upper 821 is provided with a drive motor (not shown), and a driving chain 832 is set around a drive sprocket 831 rotated by the drive motor. The driving chain 832 is returned by a sprocket 833 at the rear end of the inner rail 822, and one end thereof is fixed to a center bracket 834 bridged to the rear end portion of the center rail 823. Also, the driving chain 832 is returned by a sprocket 835 at the front end of the inner rail 822, and the other end thereof is fixed to the center bracket 834 of the center rails 823.

By this configuration, a drive mechanism is formed which moves the center rails 823 forward and backward with respect to the inner rails 822 when the driving chain 832 is driven by the drive sprocket 831.

Also, one end of a return chain 841 is fixed to the swivel upper 821, and the return chain 841 is returned by a sprocket 842 at the rear end of the center rail 823. The other end of the return chain 841 is fixed to an outer bracket 843 bridged between the rear end portions of the outer rails 824.

By this configuration, a pullback mechanism is formed in which when the driving chain 832 is driven to pull back the center rails 823 to the proximal end side, the sprocket 842 at the rear end of the center rail 823 moves an intermediate portion of the return chain 841 to the proximal end side, so that the return chain 841 pulls back the outer rails 824. Thereby, the seat 801 supported on the outer rails 824 can be pulled back into the cabin.

However, for the vehicular seat as constructed above, when the outer rails 824 are extended to the outside of cabin, the extending movement inevitably relies on a lowering force due to gravitation along the inclined center rails 823.

Therefore, if the outer rails 824 are caught by something, the outer rails 824 cannot be extended smoothly, which hinders the movement of the seat 801.

SUMMARY OF THE INVENTION

The present invention has been made in view of the above conventional problems, and accordingly an object thereof is to provide a vehicular seat capable of achieving smooth sliding motion.

To solve the above problem, the present invention provides a vehicular seat in which a slide mechanism for sliding a seat includes a base; a first slider supported so as to be capable of freely extending to the tip side beyond the base; a second slider which is supported so as to be capable of freely extending to the tip side beyond the first slider and is provided with the seat; a drive mechanism for moving the first slider wit respect to the base; and a pullback mechanism for moving the first slider to the proximal end side according to the movement of the second slider to the proximal end side when the second slider having been extended to the tip side is moved to the proximal end side, wherein there is provided a sending-out mechanism for moving the second slider to the tip side according to the movement of the first slider to the tip side when the first slider is moved to the tip side.

That is to say, when the seat is moved to the tip side by the slide mechanism, the first slider supported on the base is moved to the tip side by the drive mechanism. Then, the second slider on which the seat is provided is moved to the tip side according to the movement of the first slider by the sending-out mechanism.

Thus, a driving force from the drive mechanism for moving the first slider is transmitted to the second slider, and the second slider on which the seat is provided is moved by this driving force.

Also, in the vehicular seat as set forth above, the sending-out mechanism is formed by fixing one end portion of a linear member such as a chain on the tip side of the base, by fixing the other end portion of the linear member on the rear end side of the second slider, and by setting a turn point, at which the linear member is returned in an intermediate portion, on the tip side of the first slider.

That is to say, on the tip side of the base and on the rear end side of the second slider, the ends of the linear member such as a chain are fixed, and the intermediate portion of the linear member is returned at the turn point on the tip side of the first slider. Therefore, when the first slider is moved to the tip side by the drive mechanism, a force directed to the tip side is applied to the intermediate portion of the linear member. Then, the second slider to which the other end portion of the linear member is fixed is pulled by the linear member and is moved to the tip side.

Further, in the vehicular seat as set forth above, a seat leg for supporting a support bar for a footrest so as to be capable of freely being pulled out is provided between the seat and the second slider, and a lock mechanism is provided in which when a storage state is formed by moving the footrest toward the seat leg, the movement of the support bar in the pullout direction from the seat leg is blocked.

That is to say, when the storage state is formed by moving the footrest toward the seat leg, the movement of the support bar of the footrest in the pullout direction from the seat leg is blocked by the lock mechanism.

Therefore, the footrest in the storage state can be held surely.

In addition, in the vehicular seat as set forth above, an engagement groove is provided in the side face of the support bar, and the lock mechanism is formed by providing a locking claw which is urged toward the side face of the support bar and engages with the engagement groove in the support bar in the storage state and a release lever for releasing an engagement state of the locking claw with the engagement groove at the operation time.

That is to say, when the footrest is made in the storage state, the locking claw urged toward the side face of the support bar is engaged with the engagement groove formed on the side face of the support bar, whereby the movement of the footrest in the pullout direction is blocked.

When the footrest is used, the engagement state of the locking claw with the engagement groove is released by the operation of the release lever.

Also, in the vehicular seat as set forth above a handle for operation is provided in one side portion of the footrest; the support bar is formed by a first bar extending from one side portion in which the handle is provided and a second bar extending from the other side portion; the seat leg is provided with a first holding portion for holding the first bar so as to be capable of freely being pulled out and a second holding portion for holding the second bar so as to be capable of freely being pulled out; and the slidable contact resistance between the second bar and the second holding portion is set so as to be lower than the slidable contact resistance between the first bar and the first holding portion.

That is to say, the handle for operation is provided in one side portion of the footrest, and the footrest is pulled out or stored by using this handle.

At this time, the slidable contact resistance between the second bar and the second holding portion that are distant from the handle is set so as to be lower than the slidable contact resistance between the first bar and the first holding portion that are close to the handle. Therefore, the sliding motion of the second bar at which the operating force from the handle is low can be performed smoothly.

DETAILED DESCRIPTION OF THE PREFERRED EMBODIMENTS

Figure 1:
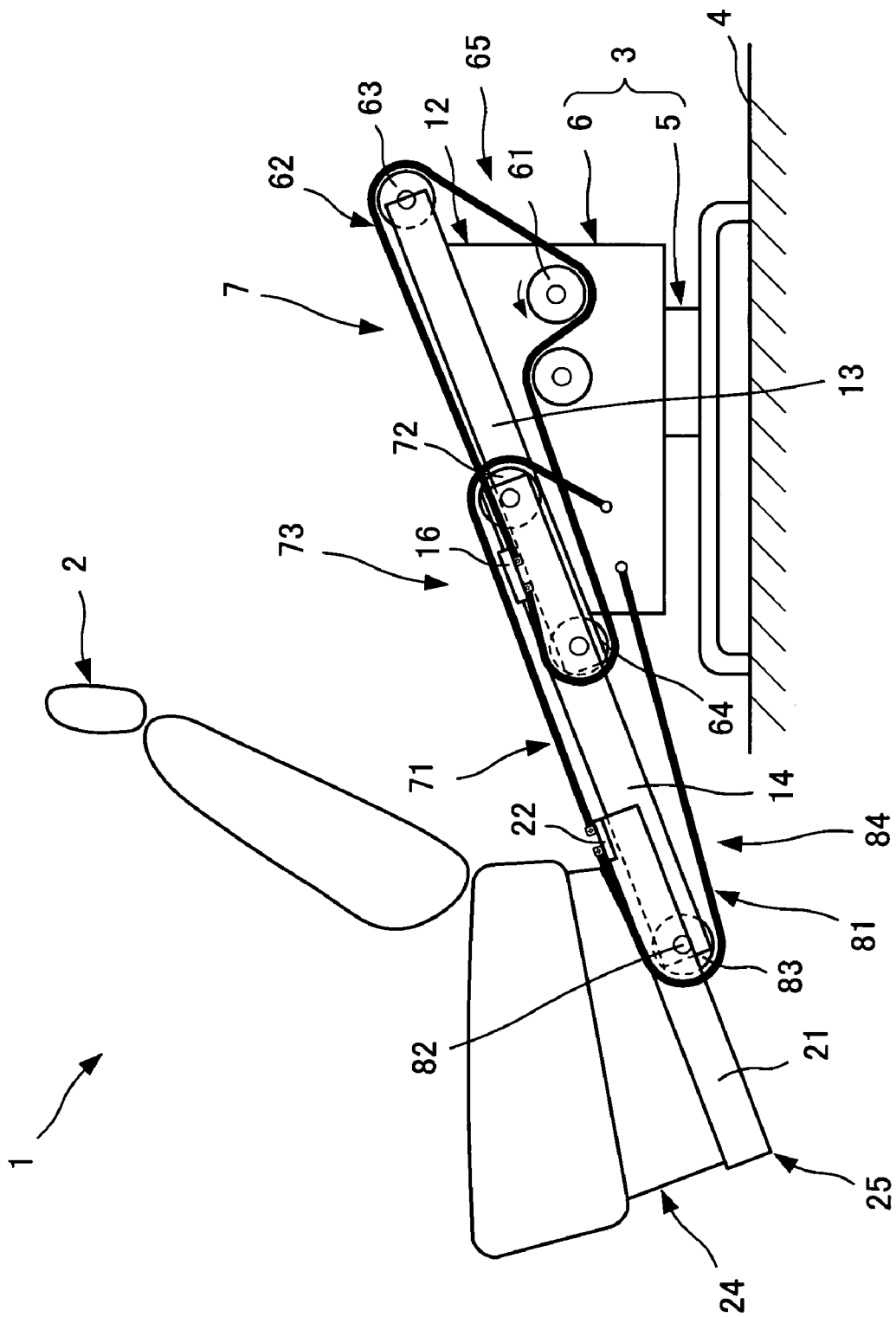
FIG. 1 is a side view showing one embodiment of the present invention.

An embodiment of the present invention will now be described with reference to the accompanying drawings. FIG. 1 is a view of a vehicular seat 1 in accordance with the embodiment, which shows a state in which a seat 2 is fixed to a floor 4 via a driving unit 3. The driving unit 3 includes a rotation mechanism 5 fixed to the floor 4 and a slide mechanism 6 turned by the rotation mechanism 5, and is constructed so as to be capable of moving the seat 2, which is supported on slide rails 7 of the slide mechanism 6, to the outside of cabin after turning the seat 2 to the door opening side.

Figure 2:
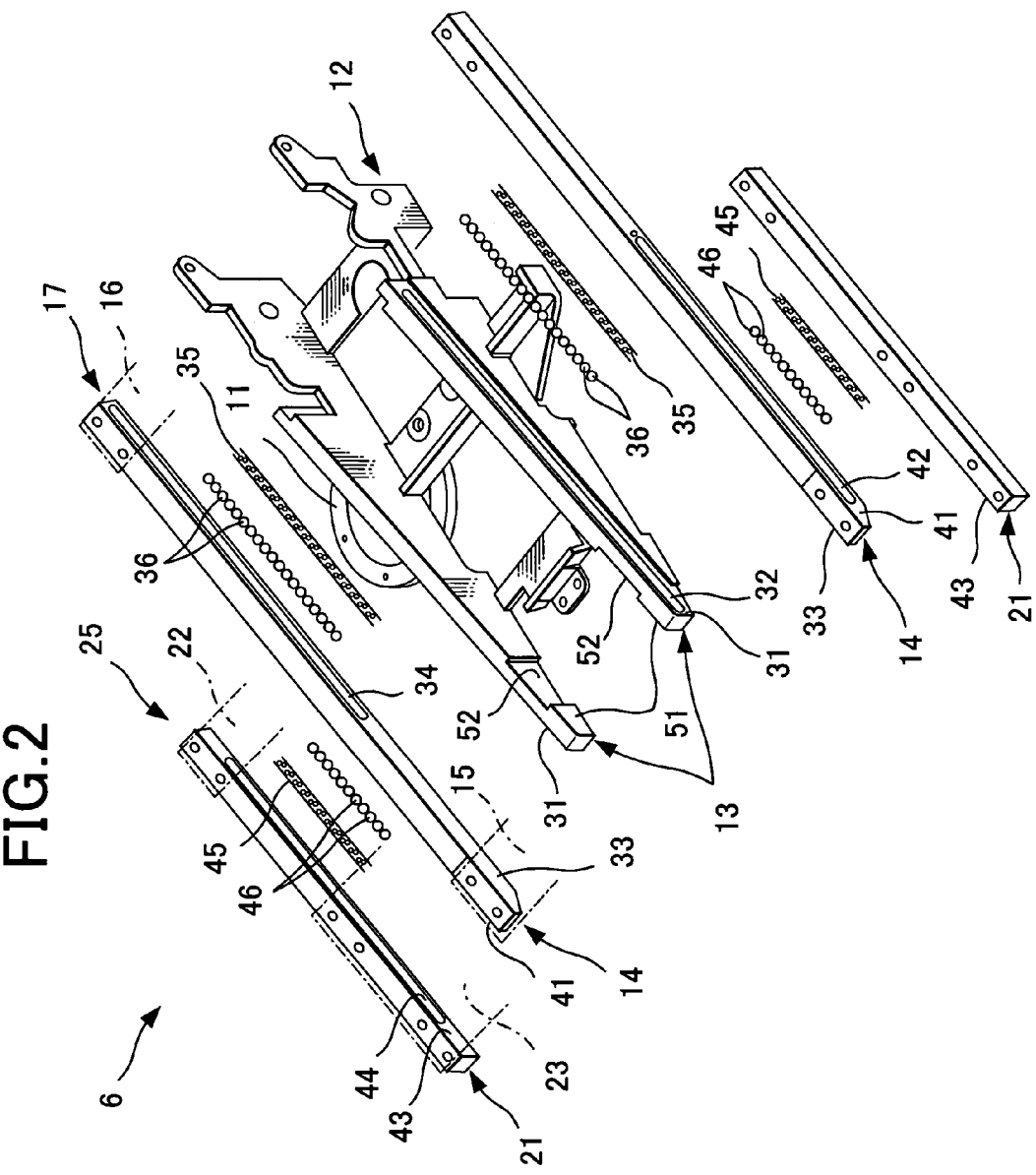
FIG. 2 is an exploded perspective view showing the embodiment shown in FIG. 1.

As shown in FIG. 2, a rotating shaft 11 of the rotation mechanism 5 supports a swivel upper 12 that forms a base for the slide mechanism 6. The swivel upper 12 is formed with a pair of inner rails 13, 13 provided spacedly in parallel. On the outside of each of the inner rails 13, 13, a pair of center rails 14, 14 are provided. On the upper faces at the front and rear end portions of both the center rails 14, 14, plate-shaped brackets 15 and 16 are bolted in a bridge-like form, respectively. Thereby, both the center rails 14, 14 are connected to each other, and a first slider 17 that is supported so as to be extendable to the tip side beyond the swivel upper 12 is formed.

On the outside of the center rails 14, 14 of the first slider 17, a pair of outer rails 21, 21 are arranged. On the upper faces at the rear end portions of both the outer rails 21, 21 as well, a plate-shaped bracket 22 is bolted in a bridge-like form, whereby both the outer rails 21, 21 are connected to each other. Also, on the upper faces at the front end portions of both the outer rails 21, 21, a wide fixing bracket 23 is bolted in a bridge-like form. Both the outer rails 21, 21 are connected to each other by this fixing bracket 23, and also the seat 2 is fixed on the fixing bracket 23 via a seat leg 24 as shown in FIG. 1. Thereby, a second slider 25 is formed which is supported so as to be extendable to the tip side beyond the first slider 17 and is provided with the seat 2.

As shown in FIG. 2, in outside faces 31, 31 of each of the inner rails 13, 13 formed on the swivel upper 12, a V-groove 32 (only one side is shown in the figure) is formed longitudinally. Also, in inside faces 33, 33 of the center rails 14, 14 of the first slider 17, which face the V-groove 32, a V-groove 34 (only one side is shown in the figure) is formed longitudinally. In a space formed by both the V-grooves 32, 32, 34, 34, steelballs 36, . . . that are positioned in holes in a holding element 35 are housed so as to be movable. Thereby, the center rails 14, 14 are supported so as to be movable in the lengthwise direction with respect to the inner rails 13, 13.

In outside faces 41, 41 of each of the center rails 14, 14 of the first slider 17, a V-groove 42 (only one side is shown in the figure) is formed longitudinally. Also, in inside faces 43, 43 of the outer rails 21, 21 of the second slider 25, which face the V-groove 32, a V-groove 44 (only one side is shown in the figure) is formed longitudinally. In a space formed by both the V-grooves 42, 44, steel balls 46, . . . that are positioned in holes in a holding element 45 are housed so as to be movable. Thereby, the outer rails 21, 21 are supported so as to be movable in the lengthwise direction with respect to the center rails 14, 14.

In inside faces 51, 51 in front end portions of both the inner rails 13, 13, attachment portions 52, 52 are provided in a concave form, and a sprocket supporting bracket (not shown) is fixed to each of the attachment portions 52, 52.

In the rear portion of the inner rails 13, 13, a drive motor (not shown) is provided. As shown in FIG. 1, a driving chain 62 is set around a drive sprocket 61 that is rotated by the drive motor. The driving chain 62 and each sprocket described later are provided in a pair on the right and left.

The driving chain 62 is returned by a sprocket 63 provided in the rear end portion of the inner rail 13, 13, and one end thereof is fixed to the bracket 16 bridged between the rear end portions of the center rails 14, 14 of the first slider 17. The driving chain 62 is returned by a sprocket 64 provided in the front end portion of the inner rail 13, 13, and the other end thereof is fixed to the bracket 16. Thereby, there is formed a drive mechanism 65 for moving the first slider 17 including the center rails 14, 14 with respect to the swivel upper 12.

Under the front end portion of the inner rail 13, 13, one end of a return chain 71, which is a linear member, is fixed. The return chain 71 is returned by a sprocket 72 provided in the rear end portion of the center rail 14, 14 of the first slider 17, and the other end thereof is fixed to the bracket 22 in the rear end portions of the outer rails 21, 21 of the second slider 25. Thereby, a pullback mechanism 73 is formed in which when the driving chain 62 is driven to pull the first slider 17 back to the proximal end side, the sprocket 72 at the rear end of the first slider 17 moves an intermediate portion of the return chain 71 to the proximal end side, whereby the return chain 71 pulls the second slider 25 back to the proximal end side.

Also, under the front end portion of the inner rail 13, 13, one end of a sending-out chain 81, which is a linear member, is fixed. The sending-out chain 81 is returned by a sprocket 83 at a turn point 82 set in the front end portion of the center rail 14, 14 of the first slider 17, and the other end thereof is fixed to the bracket 22 in the rear end portions of the outer rails 21, 21. Thereby, there is formed a sending-out mechanism 84 for moving the second slider 25 to the tip side beyond the first slider 17 at the same time that the driving chain 62 is driven by the drive sprocket 61 to move the first slider 17 to the tip side beyond the swivel upper 12. Thereupon, the seat 2 supported on the second slider 25 can be slid along the slide rails 7.

Figure 3:
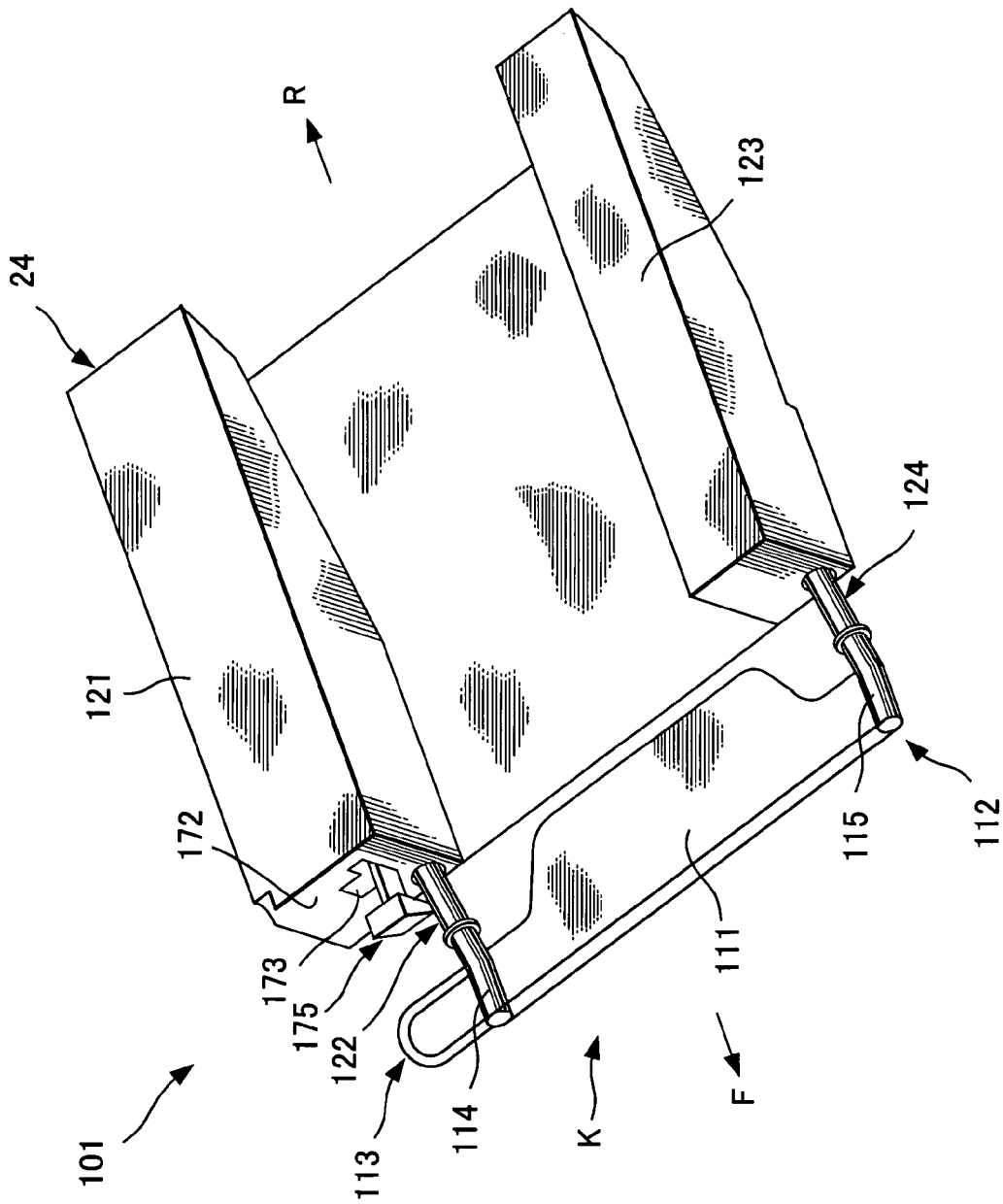
FIG. 3 is a perspective view of a seat leg of the embodiment shown in FIG. 1.

The seat leg 24 is provided with a footrest 101 as shown in FIG. 3.

The footrest 101 includes a footrest plate 111 on which the seater puts his/her foot and support bars 112 for supporting the footrest plate 111. A handle 113 for pulling out/pushing in the footrest 101 extends to the right from the right-hand side portion of the footrest plate 111. The support bars 112 are made up of a first bar 114 extending to the rear R from the right-hand side portion of the footrest plate 111 provided with the handle 113 and a second bar 115 extending to the rear R from the left-hand side portion of the footrest plate 111. Both the bars 114 and 115 are formed of a metallic round bar. The support bars 112 made up of both the bars 114 and 115 are supported so as to be capable of being freely pulled out of the seat leg 24 provided under the seat.

On a first box 121 provided in the right-hand side portion of the seat leg 24, a first holding pipe 122, which is a first holding portion, is fixed in a state of being inclined downward to the front, and in the first holding pipe 122, the first bar 114 is inserted so as to be capable of being freely inserted and drawn. Also, on a second box 123 provided in the left-hand side portion of the seat leg 24, a second holding pipe 124, which is a second holding portion, is fixed in a state of being inclined downward to the front, and in the second holding pipe 124, the second bar 115 is inserted so as to be capable of being freely inserted and drawn.

Both the bars 114 and 115 are configured so that the extension thereof from each of the holding pipes 122, 124 is regulated by a stopper (not shown), and at the normal time, a storage state K can be formed in which both the bars 114 and 115 are inserted in the holding pipes 122 and 124, respectively, to move the footrest plate 111 toward the seat 2. Also, they are configured so that when the footrest 101 is used, a pulling-out state (not shown) can be formed by pulling the bars 114 and 115 out of the holding pipes 122 and 124, respectively, to arrange the footrest plate 111 on the front side of the seat 2.

Figure 4:
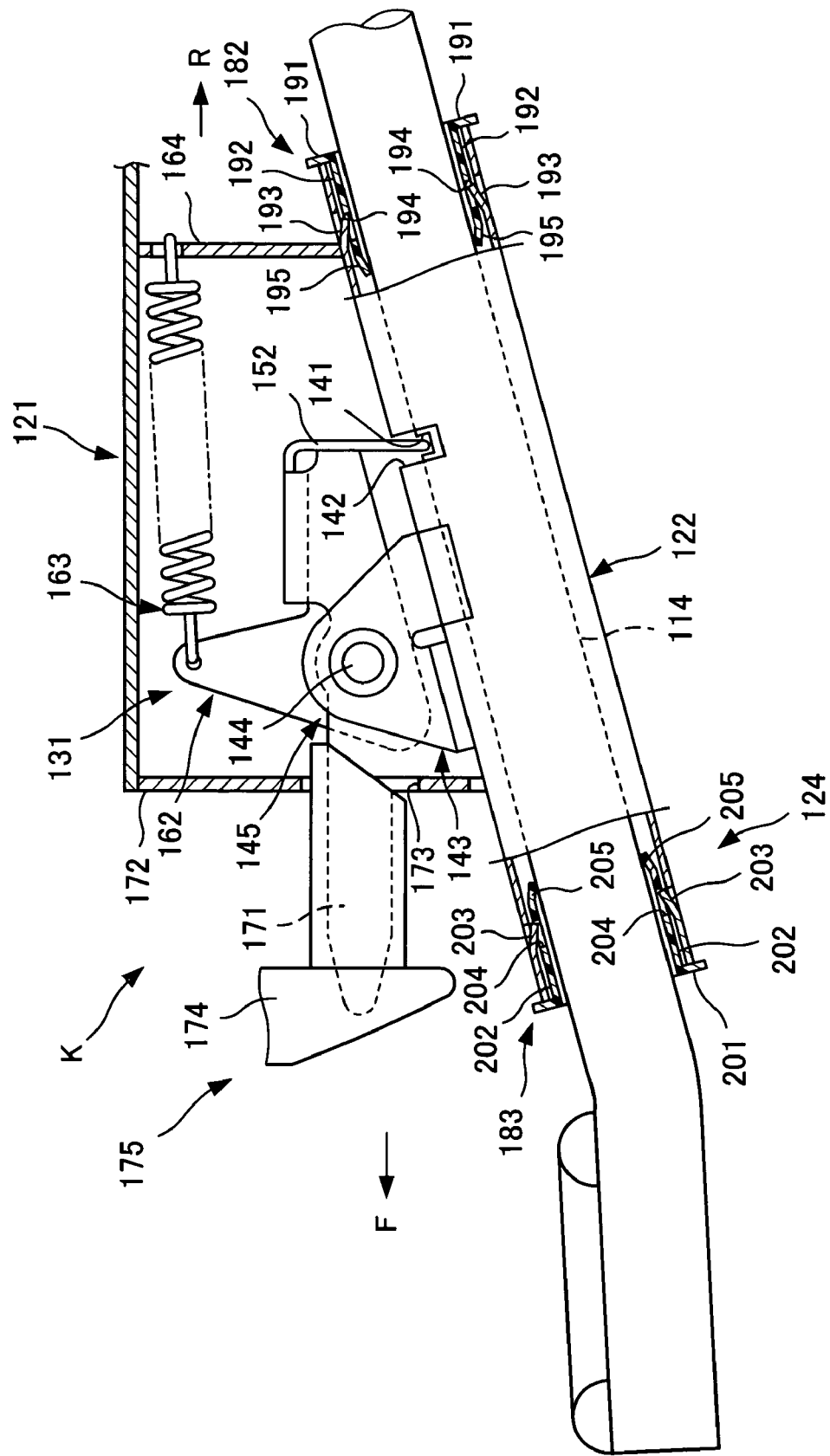
FIG. 4 is a sectional view of an essential portion of a seat leg of the embodiment shown in FIG. 1.

As shown in FIG. 4, in the first box 121, there is provided a lock mechanism 131 for blocking the movement in the pulling-out direction of the first bar 114 from the first holding pipe 122 when the storage state K is formed.

Figure 5:
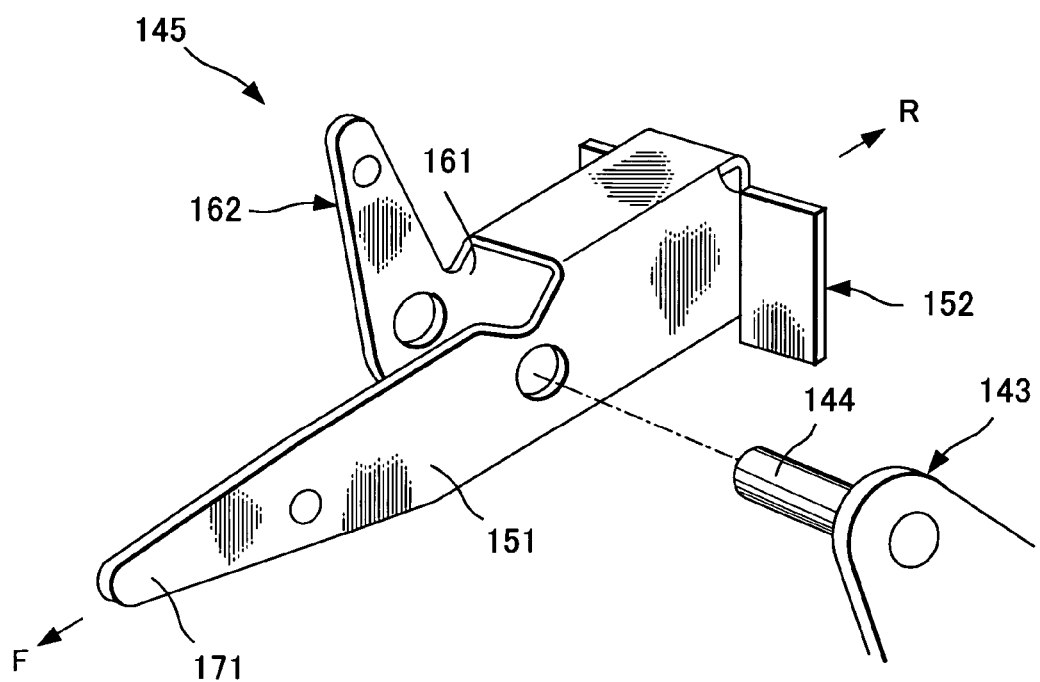
FIG. 5 is a perspective view of a lever component of the embodiment shown in FIG. 1.

Specifically, on the upper face of the first bar 114, a linear engagement groove 141 extending transversely is formed, and in the first holding pipe 122, a notch 142 is formed above a position at which the engagement groove 141 in the first bar 114 is located in the storage state K. Also, on the front F side of the notch 142 is fixed a support bracket 143, and a lever component 145 is rotatably supported on a rotating shaft 144 at the upper part of the support bracket 143 as shown in FIG. 5.

The lever component 145 is formed by bending a metal sheet, and a locking claw 152 that is bent transversely and extends downward is provided at the rear end of the left-hand side portion 151 of the lever component 145. As shown in FIG. 4, the locking claw 152 passes through the notch 142 in the first holding pipe 122 and engages with the engagement groove 141 in the first bar 114, which is in the storage state K, in a state of being inserted.

In the right-hand side portion 161 of the lever component 145 (see FIG. 5), a protrusion 162 protruding upward is formed. To the tip end of the protrusion 162, one end of a coil spring 163 is locked. The other end of the coil spring 163 is locked to an upright wall 164 in the first box 121. For the lever component 145, the locking claw 141 is urged toward the side face of the first bar 114 by the coil spring 163.

From the left-hand side portion 151 of the lever component 145 (see FIG. 5), a tongue 171 extending toward the front F is formed. The tongue 171 passes through an opening 173 in the front wall 172 of the first box 121. A resin-made knob 174 is fitted on the tongue 171, and there is formed a release lever 175 for releasing an engagement state with the engagement groove 141 by displacing the locking claw 152 upward when the knob 174 is pressed downward by a finger.

Figure 6:
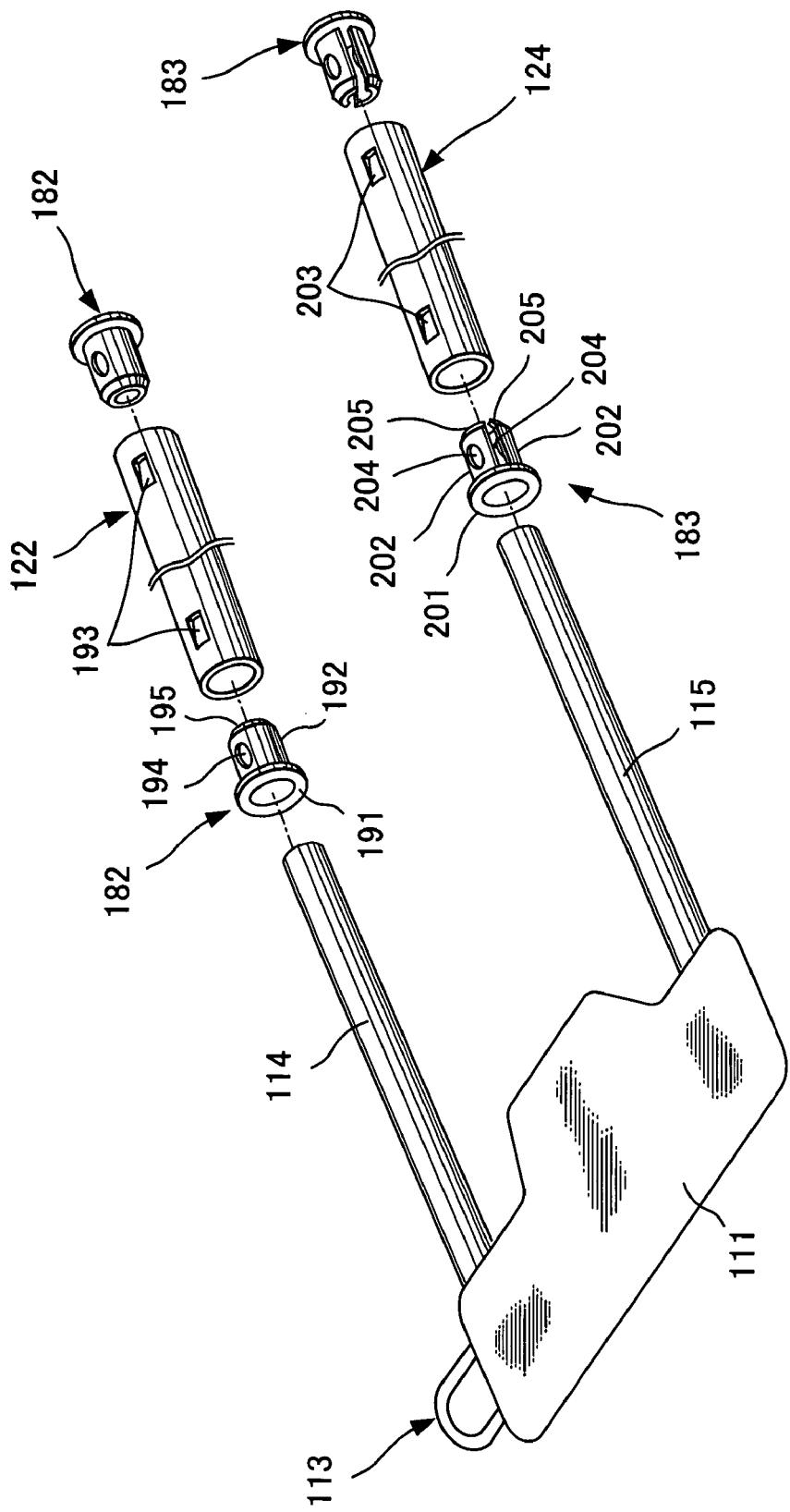
FIG. 6 is an exploded perspective view of a foot rest of the embodiment shown in FIG. 1.
Figure 7:
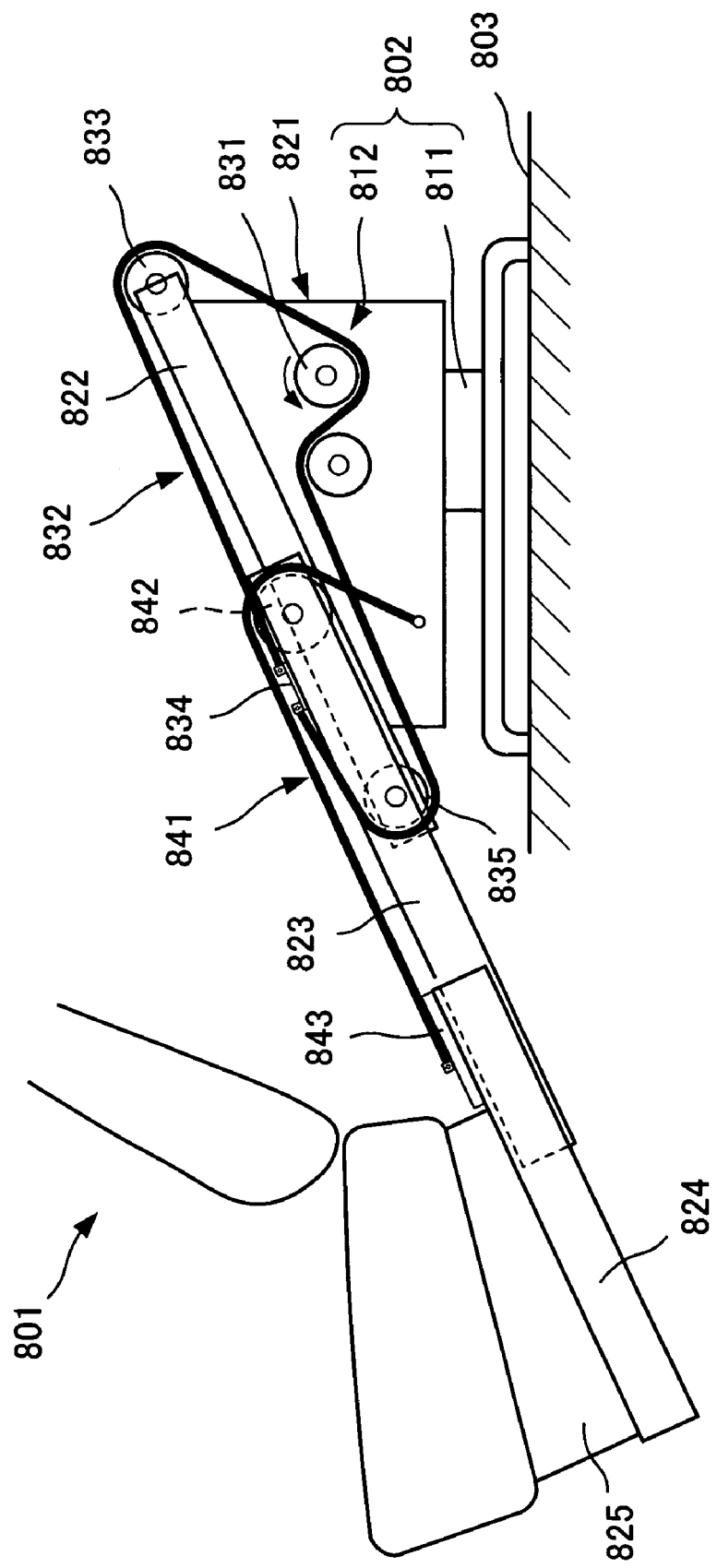
FIG. 7 is a side view of a conventional vehicular seat.

As shown in FIG. 6, at the front and rear ends of the first holding pipe 122, resin-made first bushes 182 through which the first bar 114 passes are inserted, and at the front and rear ends of the second holding pipe 124, resin-made second bushes 183 through which the second bar 115 passes are inserted.

The first bush 182 consists of a circular ring shaped collar portion 191 and a cylindrical portion 192 extending from the collar portion 191, and the cylindrical portion 192 is formed with an engagement hole 194 with which a claw 193 formed by cutting and raising a part of the first holding pipe 122 engages. At the tip end of the cylindrical portion 192, a diameter-decreasing portion 195 narrowed toward the center is formed so that the diameter-decreasing portion 195 is in slidable contact with the whole circumferential surface of the first bar 114.

On the other hand, the second bush 183 consists of a circular ring shaped collar portion 201 and extensions 202, 202 of an arcuate shape in cross section, which extend from the collar portion 201 so as to face each other. Each extension 202, 202 is formed with an engagement hole 204, 204 with which a claw 203 formed by cutting and raising a part of the second holding pipe 124 engages. At the tip end portion of the extension 202, 202, a bent portion 205, 205 bent toward the center is formed so that both the bent portions 205, 205 are in slidable contact with the circumferential surface of the second bar 115.

Thereby, the slidable contact resistance between the second holding pipe 124 in which the second bushes 183 are fitted and the second bar 115 is set so as to be lower than the slidable contact resistance between the first holding pipe 122 in which the first bushes 182 are fitted and the first bar 114.

In this embodiment configured as described above, when the seat 2 is moved to the tip side by the slide mechanism 6, the first slider 17 supported on the swivel upper 12 is moved to the tip side by the drive mechanism 65.

Specifically, on the tip side of the swivel upper 12 and at the rear end side of the second slider 25 provided with the seat 2, the ends of the sending-out chain 81 are fixed, and an intermediate portion of the sending-out chain 81 is returned by the sprocket 83 provided at the turn point 82 on the tip side of the first slider 17. Therefore, when the first slider 17 is moved to the tip side by the drive mechanism 65, a force directed to the tip side is applied to the intermediate portion of the sending-out chain 81.

Thereby, the second slider 25 to which the end portion of the sending-out chain 81 is fixed is pulled by the sending-out chain 81, and is moved to the tip side, so that the seat 2 provided on the second slider 25 is moved to the tip side through by the sending-out mechanism 84 for a distance equal to twice the travel distance of the first slider 17.

Thus, the second slider 25 is moved to the tip side by a driving force transmitted from the drive mechanism 65 that moves the first slider 17, whereby the seat 2 provided on the second slider 25 can be moved to the tip side. Therefore, even if the second slider 25 on which the seat 2 is provided is caught by something, the movement of the second slider 25 and the seat 2 can be continued by the driving force transmitted from the drive mechanism 65.

Therefore, the seat 2 can slide smoothly at a fixed speed as compared with the case where the travel speed of the seat 2 changes when the second slider 25 is caught by something.

On the other hand, when the storage state K is formed by moving the footrest 101 toward the seat leg 24 under the seat 2, the support bars 112 of the footrest 101 are prevented by the lock mechanism 131 from moving in the direction such as to be pulled out of the seat leg 24. Therefore, the footrest 101 in the storage state K can be held surely without increasing the holding force of the support bars 112.

Thus, the footrest 101 can be held surely without impairing the pulling-out operability.

Also, merely by storing the footrest 101, the locking claw 152 of the lock mechanism 131 urged toward the side face of the first bar 114 can be engaged with the engagement groove 141 in the side face of the first bar 114. Thereby, a locked state in which the movement of the footrest 101 in the pulling-out direction is blocked can be formed.

When the footrest 101 is used, while the handle 113 in the right-hand side portion of the footrest plate 111 is gripped by one hand, the release lever 175 of the lock mechanism 131 is pressed downward by the thumb. Thereby, the locking claw 152 is moved upward, and an unlocked state in which the engagement state of the locking claw 152 with the engagement groove 141 is released can be formed.

Thus, at the storage time, merely by storing the footrest 101, the locked state can be formed. Also, at the pullout time, the unlocked state can be formed by a hand operating the handle 113 of the footrest 101.

Also, by operating the handle 113, the footrest 101 can be pulled out or stored. Therefore, the hand can be prevented from being soiled at the operation time.

At this time, the slidable contact resistance between the second bar 115 and the second holding pipe 124 that are distant from the handle 113 is set so as to be lower than the slidable contact resistance between the first bar 114 and the first holding pipe 122 that are close to the handle 113. Therefore, the sliding motion of the second bar 115 at which the operating force from the handle 113 is low can be performed smoothly.

Accordingly, both the bars 114 and 115 can be moved in parallel, and hence the pullout and storage operations of the footrest 101 can be performed easily.

In this embodiment, a case where the drive mechanism 65, the pullback mechanism 73, and the sending-out mechanism 84 are driven by chains 62, 71 and 81 has been explained as an example. However, the driving means is not limited to the chain, but these mechanisms may be driven by a belt, a wire, or other linear members.

As described above, in the vehicular seat as set forth in claim 1, the second slider is moved to the tip side by the driving force transmitted from the drive mechanism for moving the first slider, and hence the seat provided on the second slider can be moved to the tip side. Therefore, even if the second slider on which the seat is provided is caught by something, the movement of the second slider and the seat can be continued by the driving force transmitted from the drive mechanism.

Therefore, the seat can be slid smoothly at a fixed speed as compared with the case where the travel speed of the seat changes when the second slider is caught by something.

Also, in the vehicular seat as set forth in claim 2, the ends of the linear member such as a chain are fixed to the tip side of the base and the rear end side of the second slider, and the intermediate portion thereof is returned at the turn point on the tip side of the first slider, whereby the sending-out mechanism can be formed to move the second slider to the tip side along with the movement of the first slider.

Thereby, the construction can be simplified.

Further, in the vehicular seat as set forth in claim 3 and claim 4, the movement in the pullout direction of the support bars of the footrest in the storage state can be blocked by the lock mechanism. Therefore, even if a great force is produced, for example, at the vehicle collision time, the support bars can be held surely without increasing the holding force of the support bar.

Thus, the footrest can be held surely without impairing the pulling-out operability.

In addition, in the vehicular seat as set forth in claim 5 and claim 6, merely by making the footrest in the storage state, the locking claw urged toward the support bar is engaged with the engagement groove in the support bar, so that the movement in the pullout direction of the footrest can be blocked. When the footrest is used, the engagement state of the locking claw with the engagement groove can be released by the operation of the release lever.

Thereby, the locked state and the unlocked state of footrest can be formed easily.

Also, in the vehicular seat as set forth in claims 7,8,9 and 10 the footrest can be pulled out or stored by operating the handle provided in one side portion of the footrest. Thereby, the hand can be prevented from being soiled at the operation time.

At this time, the slidable contact resistance between the second bar and the second holding portion that are distant from the handle is set so as to be lower than the slidable contact resistance between the first bar and the first holding portion that are close to the handle. Therefore, the sliding motion of the second bar at which the operating force from the handle is low can be performed smoothly.

Accordingly, both the bars can be moved in parallel, and hence the pullout and storage operations of the footrest can be performed easily.

What is claimed is:

1. A sliding vehicular seat comprising
   a base for mounting in a vehicle;
   a first frame having a first frame end and a second frame end and slidably supported on said base so as to extend said first frame end in an extending direction from a first frame first position proximate said base to a first frame second position extended from said base;
   a second frame having a seat and slidably supported on said first frame so as to extend said second frame end in the extending direction from a second frame first position retracted on said first frame to a second frame second position extended from said first frame and said base;

a first drive mechanism for extending and retracting said first frame relative to said base between said first frame first position and said first frame second position extended from said base, said first drive mechanism having a first driven member extending and retracting said first frame relative to said base; and a second drive mechanism for extending and retracting said second frame relative to said base and said first frame between said second frame first position and said second frame second position extended from said base, said second drive mechanism having a second driven member connected to said second frame to apply force to said second frame to extend said second frame relative to said first frame to said second frame second position, said second driven member being independent of said first driven member and driven by displacement of said first frame relative said base.

2. The sliding vehicular seat according to claim 1, wherein:

said second driven member is a flexible linear member having a first end connected to said second frame, and a second end connected to said base; and said first end of said first frame has a turnaround member around which an intermediate portion of said flexible linear member travels so as to reverse a travel direction of said flexible linear member.

3. The sliding vehicular seat according to claim 2, further comprising:

a seat leg for supporting said seat on said second frame;

a footrest;

a support bar structure for supporting said footrest extendable from the seat leg so as to be capable of freely being pulled out and pushed in; and a lock mechanism locking a position of said support bar structure in a stowed state with said footrest retracted in response to said support bar structure being pushed in toward said seat leg.

4. The sliding vehicular seat according to claim 3, wherein:

said support bar structure has an engagement groove is provided in a side face of said support bar structure;

said lock mechanism has a locking claw biased toward an upper face of said support bar structure and which engages with said engagement groove in said support bar in said stowed state; and said lock mechanism has a release lever for releasing an engagement state of said locking claw with said engagement groove at operation time.

5. The sliding vehicular seat according to claim 4, further comprising:

a handle provided at one side portion of said footrest;

said support bar structure includes:

a first bar extending from the one side portion of said footrest at which said handle is provided; and a second bar extending from another side portion of said footrest;

said seat leg having:

a first holding portion for holding said first bar so as to be capable of freely being pulled out; and a second holding portion for holding said second bar so as to be capable of freely being pulled out; and a slidable contact resistance between said second bar and said second holding portion being lower than a slidable contact resistance between said first bar and said first holding portion.

6. The sliding vehicular seat according to claim 1, further comprising:

a seat leg for supporting said seat on said second frame;

a footrest;

a support bar structure for supporting said footrest extendable from the seat leg so as to be capable of freely being pulled out and pushed in; and a lock mechanism locking a position of said support bar structure in a stowed state with said footrest retracted in response to said support bar structure being pushed in toward said seat leg.

7. The sliding vehicular seat according to claim 6, wherein:

said support bar structure has an engagement groove is provided in a side face of said support bar structure;

said lock mechanism has a locking claw biased toward an upper face of said support bar structure and which engages with said engagement groove in said support bar in said stowed state; and said lock mechanism has a release lever for releasing an engagement state of said locking claw with said engagement groove at operation time.

8. The sliding vehicular seat according to claim 7, further comprising:

a handle provided at one side portion of said footrest;

said support bar structure includes:

a first bar extending from the one side portion of said footrest at which said handle is provided; and a second bar extending from another side portion of said footrest;

said seat leg having:

a first holding portion for holding said first bar so as to be capable of freely being pulled out; and a second holding portion for holding said second bar so as to he capable of freely being pulled out; and a slidable contact resistance between said second bar and said second holding portion being lower than a slidable contact resistance between said first bar and said first holding portion.

9. The sliding vehicular seat according to claim 6, further comprising:

a handle provided at one side portion of said footrest;

said support bar structure includes:

a first bar extending from the one side portion of said footrest at which said handle is provided; and a second bar extending from another side portion of said footrest;

said seat leg having:

a first holding portion for holding said first bar so as to be capable of freely being pulled out; and a second holding portion for holding said second bar so as to be capable of freely being pulled out; and a slidable contact resistance between said second bar and said second holding portion being lower than a slidable contact resistance between said first bar and said first holding portion.

10. A sliding vehicular seat comprising a base for mounting in a vehicle;

a first frame having a first frame end and a second frame end and slidably supported on said base so as to extend said first frame end in an extending direction from a first frame first position proximate said base to a first frame second position extended from said base;

a second frame having a seat and slidably supported on said first frame so as to extend said second frame end in the extending direction from a second frame first position retracted on said first frame to a second frame second position extended from said first frame and said base;

a first drive mechanism for extending and retracting said first frame relative to said base between said first frame first position and said first frame second position extended from said base;

a second drive mechanism for extending and retracting said second frame relative to said base and said first frame between said second frame first position and said second frame second position extended from said base, said second driven member being driven by displacement of said first frame relative said base;

a seat leg for supporting said seat on said second frame;

a footrest;

a support bar structure for supporting said footrest extendable from the seat leg so as to be capable of freely being pulled out and pushed in;

a handle provided at one side portion of said footrest;

said support bar structure includes:
 a first bar extending from the one side portion of said footrest at which said handle is provided; and
 a second bar extending from another side portion of said footrest;

said seat leg having:
 a first holding portion for holding said first bar so as to be capable of freely being pulled out; and
 a second holding portion for holding said second bar so as to be capable of freely being pulled out; and
a slidable contact resistance between said second bar and said second holding portion being lower than a slidable contact resistance between said first bar and said first holding portion.

11. The sliding vehicular seat according to claim 10, further comprising a lock mechanism locking a position of said support bar structure in a stowed state with said footrest retracted in response to said support bar structure being pushed in toward said seat leg.

12. The sliding vehicular seat according to claim 11, wherein:
 said support bar structure has an engagement groove is provided in a side face of said support bar structure;
 said lock mechanism has a locking claw biased toward an upper face of said support bar structure and which engages with said engagement groove in said support bar in said stowed state; and
 said lock mechanism has a release lever for releasing an engagement state of said locking claw with said engagement groove at operation time.

* * * * *